June 12, 1956  A. I. BURGET  2,749,783
VALVE CORE REMOVAL AND INSERTING TOOL
Filed Feb. 1, 1954
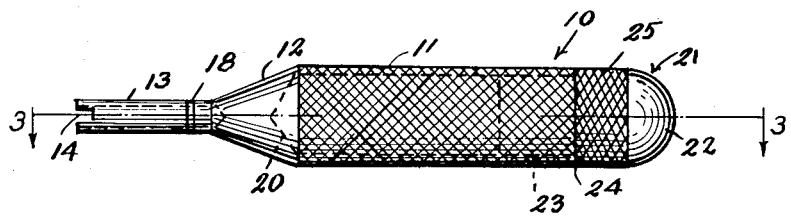
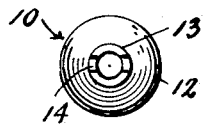
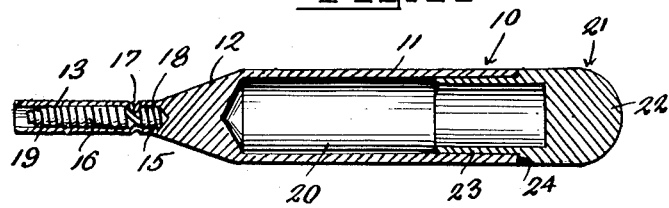
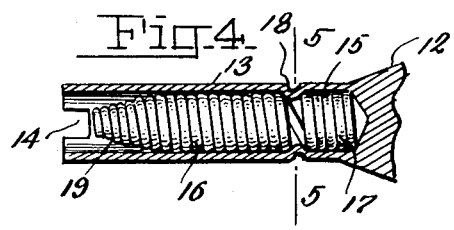
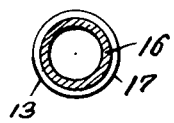
INVENTOR.
ARCHIE I. BURGET
BY
*Patrick D. Beavers*
ATTORNEY United States Patent Office 2,749,783
Patented June 12, 1956

2,749,783

VALVE CORE REMOVAL AND INSERTING TOOL

Archie I. Burget, Florence Junction, Ariz., assignor of one-third to Larry J. Melcher, Mesa, Ariz.

Application February 1, 1954, Serial No. 407,538

1 Claim. (Cl. 81—3)

This invention relates to improvements in valve core removal and inserting tools and more especially to a tool that will fit into the hand in such a manner that the removal or insertion of a valve core in accomplished with a minimum of effort.

It is a well known fact that the insertion or removal of a valve core requires great dexterity for both the core and the opening in the tire valve is small and the end of the valve core cannot be reached except with the aid of a special tool.

An object of this invention therefore is to provide a valve core removal and insertion tool that is provided with a valve core engaging portion that engages the valve core in such a way that it is easily removed from the tire valve.

Another object of the invention is to provide a valve core removal and inserting tool that will engage and retain a valve core for the insertion thereof into a tire valve.

A further object of the invention is to provide a valve core removal and inserting tool that is provided with a storage chamber for carrying spare valve cores.

With the above and other objects and advantages in view the invention consists of the novel features of construction, combination and arrangement of parts more fully hereinafter described, claimed and illustrated in the accompanying drawing in which:

Fig. 1 is an elevational view of an embodiment of the invention;

Fig. 2 is a front end view of the same;

Fig. 3 is a longitudinal sectional view on the line 3—3 of Fig. 1;

Fig. 4 is an enlarged detailed fragmentary view of the invention; and

Fig. 5 is a transverse sectional view on the line 5—5 of Fig. 4.

Referring more in detail to the drawing wherein like parts are designated by like reference numerals, the reference numeral 10 designates a valve core removal and inserting tool forming the preferred embodiment of the invention.

The tool 10 comprises a tubular hollow body 11 which is provided with a knurled outer surface, for the easy gripping thereof by the hand of the user.

The forward end of the tool 10 is provided with a conical formation 12 which merges into a hollow stem portion 13. At the forward end of the stem portion 13, there is provided a slot 14 which extends transversely of the stem portion 13, as clearly shown in Fig. 2.

The conical portion 12 is provided with a recess 15 that communicates with the stem portion 13. A coiled extension spring 16 is positioned in the stem 13 and has the rear end 17 thereof inserted into the recess 15 in the conical portion 12.

At a position in the periphery of the stem 13, slightly forward of the conical portion 12, a groove 18 is provided which forms an internal ridge positioned between two of the coils of the spring 16, as shown in Fig. 4. The groove 18 anchors the end 17 of the spring 16 in the recess 15 in the conical portion 12 of the tool 10.

As shown in Fig. 4, the forward end 19 of the spring 16 is slightly tapered to provide a conical formation which terminates just slightly inwardly of the slot 14.

The hollow body portion 11 provides a storage space 20 in which spare valve cores may be carried. The end of the body 11, remote from the conical portion 12, is open to permit the removal of the spare valve cores from the storage space 20. A cap 21 having a rounded closed end 22 and a reduced tubular extension 23 which is of a size to be inserted into the open end of the hollow body 11, is shown in Fig. 3.

An annular shoulder 24, at the termination of the reduced portion 23, abuts the end of the body portion 11 to retain the cap 21 in closed relation with the open end of the tool 10.

The exterior of the cap 23 is knurled, as at 25, to permit easy removal of the cap from the open end of the body 11.

In use the valve core is positioned in relation to the tool so that the stem of the valve core will enter the stem 13 of the tool and be retained in the foremost coils of he spring 16. The raised portions on the conventional valve core will enter the slot 14. Upon the insertion of the valve core into the tire valve, the threads of the valve core can be engaged with the interior threads in the tire valve. After the threads have become engaged, a slight pull on the tool will release the valve stem and the tool can then be used to further thread the valve core into the tire valve.

There has thus been provided an efficient valve core removal and inserting tool and it is believed that from the foregoing description, the operation and construction of the invention will be apparent to those skilled in the art.

It is also to be understood that changes in the minor details of construction, arrangement and combination of parts may be resorted to, provided they fall within the spirit of the invention and the scope of the appended claim.

Having thus described the invention what is claimed as new and desired to be secured by Letters Patent is:

I claim:

A valve core removal and inserting tool comprising a body portion having a conical formation at one end, a tubular stem having a transverse slot in its forward end extending outwardly of said conical formation, a recess in said conical formation communicating with said tubular stem, a coil spring positioned in said tubular stem with the inner end thereof positioned in the recess in said conical formation and the outer end thereof terminating slightly inwardly of the slot in said tubular stem, and an annular ridge in said tubular stem entering the coils of said spring to anchor the rear end thereof in the recess in said conical formation, said outer end of said spring being of outwardly diminishing tapered formation.

References Cited in the file of this patent

UNITED STATES PATENTS

| | | |
|---|---|---|
| 298,649 | Yingling | May 13, 1884 |
| 1,468,715 | Guerrieri | Sept. 25, 1923 |
| 1,627,886 | Cooley | May 10, 1927 |
| 2,054,138 | Sandell | Sept. 15, 1936 |
| 2,320,044 | Merriman | May 25, 1943 |